United States Patent [19]

Mitchell

[11] 4,445,532

[45] May 1, 1984

[54] PRESSURE REGULATOR SYSTEM

[75] Inventor: John D. Mitchell, Phoenix, Ariz.

[73] Assignee: The Garrett Corporation, Los Angeles, Calif.

[21] Appl. No.: 85,151

[22] Filed: Oct. 15, 1979

[51] Int. Cl.³ .......................................... F17K 31/124
[52] U.S. Cl. ................................. 137/495; 60/39.142; 137/505.18; 137/505.26; 251/76; 251/77; 251/122; 251/332; 251/363
[58] Field of Search .................... 60/39.14 M; 251/25, 251/30, 63.5, 63.6, 361, 362, 363, 364, 365, 77, 282, 122, 332, 334, 76, 174; 137/505.26, 505.18, 495

[56] References Cited

U.S. PATENT DOCUMENTS

| | | | |
|---|---|---|---|
| 1,302,538 | 5/1919 | Gulick | 251/45 |
| 2,060,748 | 11/1936 | Roberts et al. | 251/332 |
| 2,237,554 | 4/1941 | Grove | 251/122 |
| 2,348,548 | 5/1944 | Koehler | 251/364 |
| 2,458,123 | 1/1949 | Wasserlein | 251/76 |
| 2,487,089 | 11/1949 | Anthes | 137/505.18 |
| 2,576,578 | 11/1951 | Dalrymple | 251/76 |
| 2,833,303 | 5/1958 | Leutwiler et al. | 137/495 |
| 2,931,616 | 4/1960 | White et al. | 251/282 |
| 2,979,067 | 4/1961 | Kern, Jr. et al. | 251/362 |
| 3,080,144 | 3/1963 | Baker | 251/360 |
| 3,164,364 | 1/1965 | McColl | 251/334 |
| 3,327,991 | 6/1967 | Wallace | 251/363 |
| 3,358,964 | 12/1967 | Cohen et al. | 137/505.18 |
| 3,568,976 | 3/1971 | Thumm | 251/63.6 |
| 3,589,671 | 6/1971 | Strache | 251/122 |
| 3,894,718 | 7/1975 | Koch et al. | 251/174 |
| 3,974,998 | 8/1976 | Wood | 251/76 |
| 4,068,468 | 1/1978 | Wood et al. | 60/39.14 M |

Primary Examiner—George L. Walton
Attorney, Agent, or Firm—J. Richard Konneker; Albert J. Miller

[57] ABSTRACT

A pressure regulator system for providing controlled reduction of fluid pressure from a relatively high pressure fluid source to a relatively low regulated fluid pressure output. The pressure regulator system includes a pressure reduction regulator designed for stable flow under transonic conditions, and an improved solenoid valve assembly for switching the reduction regulator to an operational condition.

62 Claims, 6 Drawing Figures

PRESSURE REGULATOR SYSTEM

BACKGROUND OF THE INVENTION

The subject matter of this application relates to the subject matter of concurrently filed application Ser. No. 085,152, filed Oct. 15, 1979, entitled "Solenoid Valve Assembly".

This invention relates to pressure regulator systems for providing a relatively low regulated fluid pressure output from a relatively high pressure fluid source. In one embodiment of the invention, the pressure regulator system is adapted for use as a pressure activated starting system for a gas turbine machine.

Gas turbine machines require for starting purposes a supply of pressurized fluid for initiating rotation of a turbo-compressor rotating group. Specifically, the rotating group must be accelerated to a minimum threshold speed for continued self-sustained operation of the gas turbine machine. In the prior art, one common source of pressurized starting fluid for gas turbine machines such as auxiliary power units for aircraft and the like comprises stored or bottled compressed air.

In some applications, a self-contained starting system is desirable wherein a relatively small and lightweight source of starting fluid is carried with the engine and is recharged by operation of the engine so as to allow the engine to be started whenever and wherever desired. See, for example, U.S. Pat. No. 4,068,468. In these self-contained systems, pressurized fluid is supplied from a reservoir tank through a pressure reduction regulator to the compressor of the turbo-compressor rotating group, or alternately, to a rotating starting motor. Once the gas turbine machine has reached self-sustaining operation, the reservoir is conveniently replenished with bleed air from the compressor so as to recharge the starting system for subsequent starting of the engine.

A major design difficulty in pneumatic self-contained starting systems arises in that substantial quantities of compressed fluid are required for starting the gas turbine machine. Accordingly, the reservoir is required to contain a substantial quantity of pressurized fluid for starting purposes. To reduce the size of the reservoir carried with the machine, the reservoir commonly contains this fluid at a relatively high pressure, say on the order of about 4,000 p.s.i. At these pressure levels, substantial pressure reduction through the pressure reduction regulator to say about 400 p.s.i. is necessary prior to supply of the fluid to the gas turbine machine for starting. This substantial pressure reduction results in transonic fluid flow through the pressure reduction regulator which correspondingly results in sonic shock waves and shock wave feedback whereby the regulator flow is highly irregular and unstable. It is therefore desirable to provide an improved pressure reduction regulator for use in applications such as self-contained pneumatic starting systems for providing substantial pressure reduction while at the same time assuring accurate and stable transonic flow therethrough.

A variety of other types of systems experience similar flow stability problems stemming from the reduction of a relatively high pressure fluid source to a relatively low regulated pressure fluid output. For example, pneumatic gun drives are known wherein it is necessary to reduce a high pressure fluid source of about 10,000–12,000 p.s.i. to a regulated pressure level of a few hundred p.s.i. In these other types of systems, similar fluid flow shock effects and the like are encountered resulting in a highly irregular and unstable fluid output pressure.

Another area of design difficulty in prior art pressure regulator systems comprises the operating characteristics of the control valve utilized to initiate supply of the high pressure fluid to the pressure reduction regulator. This valve typically comprises an electrically actuated solenoid valve including a valve member subjected to the relatively high pressure level of the pressurized fluid source. Accordingly, the solenoid valve must develop relatively high opening forces to overcome the pressure forces of the fluid source, and thereby initiate actuation of the system. However, it is well known that solenoid valves inherently develop increased force capacity throughout stroke of the associated valve member, whereas in this environment a maximum opening force is required in the initial stage of the valve member stroke. Therefore, in the prior art, a relatively expensive and oversized solenoid valve has been used so as to assure adequate opening forces upon initial stroke movement of the valve member. In the prior art some systems have attempted to overcome the solenoid size design problems by using a so-called impact solenoid valve wherein an armature is designed for limited lost motion movement prior to impacting a valve member. In this manner, the solenoid valve operates only through the latter, higher force portions of the stroke. See, for example, U.S. Pat. Nos. 2,612,188; 2,735,644; 3,043,336; 3,450,353; 3,473,380 and 3,974,998. However, these impact solenoid designs have not maximized the capacity of a relatively small and inexpensive solenoid valve to open a valve member to initiate actuation of the pressure regulator system.

The present invention overcomes the problems and disadvantages of the prior art by providing an improved pressure regulator system including a pressure reduction regulator for providing accurate flow and pressure under transonic flow conditions, and an improved solenoid valve assembly for maximizing the opening force capacity of a solenoid valve member.

SUMMARY OF THE INVENTION

In accordance with the invention, a pressure regulator system comprises a pressure reduction regulator coupled between a fluid supply reservoir containing a fluid pressurized to a relatively high pressure level, and a fluid-driven device such as a gas turbine machine starter requiring a motive fluid supply at a relatively low regulated pressure. The pressure reduction regulator includes a bulbular poppet valve adapted to seat upon a matingly configured multiple piece valve seat disposed between a high pressure inlet, and a low or regulated pressure outlet or exducer section. The poppet valve is positioned on the high pressure side of the valve seat, and has a generally conical cross section expanding in an upstream direction for self-centering and self-seating alignment upon the valve seat in response to pressure. Importantly, the poppet valve cross section has an included angle of on the order of about 40° extending from the high pressure side through the valve seat and partially into the exducer section to smoothly guide transonic high pressure flow through the valve seat. When closed, the poppet valve seats upon an annular ring formed from a plastic material or the like which wedges or bottoms against a rigid metal valve seat base.

The poppet valve is opened by introduction of the high pressure fluid into communication with one portion of a balancing system for balancing forces on opposite ends of the poppet valve. Moreover, a static pressure reference regulator couples a controlled and selectively reduced static pressure to another portion of the balancing system to create imbalanced forces to lift the poppet valve from the valve seat. When opened, the poppet valve modulates in response to the pressure of the high pressure fluid, and in response to the reference static pressure to provide a reduced regulated fluid pressure in the exducer section comprising a known function of the reference static pressure.

An improved solenoid valve assembly is provided for selectively coupling the high pressure fluid to the pressure reduction regulator when operation of the system is desired. This solenoid valve assembly includes an electrically controlled armature assembly for impacting a valve member to shift the valve member to an open position allowing high pressure flow through the pressure reduction regulator. More specifically, the armature assembly comprises an armature operably associated with a lost motion unit including a valve actuator and an energy storage spring. Movement of the armature through the initial stages of armature stroke moves the valve actuator to compress the spring for storing energy in the spring. Movement of the armature through latter stages of the stroke causes the valve actuator to impact the valve member, and this impact energy together with energy stored by the spring is sufficient to lift the valve member from its associated valve seat.

BRIEF DESCRIPTION OF THE DRAWINGS

The accompanying drawings illustrate the invention. In such drawings.

DETAILED DESCRIPTION OF THE PREFERRED EMBODIMENT

Figure 1:
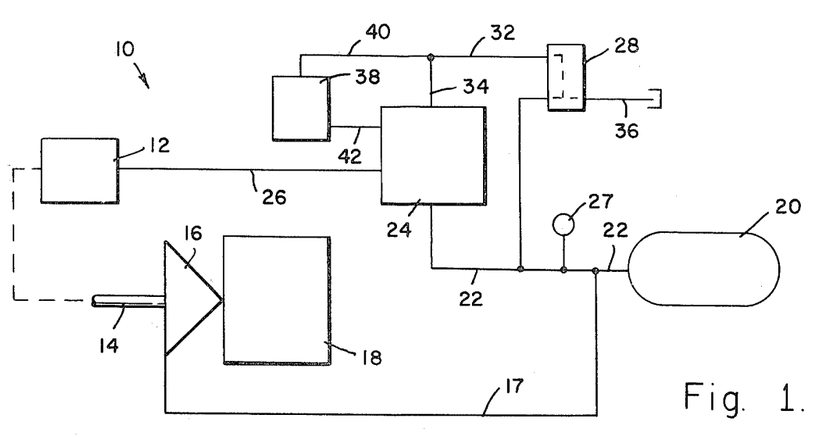
FIG. 1 is a schematic diagram illustrating a pneumatic starting system for a gas turbine machine, and including a pressure regulator system of this invention.

A pneumatic self-contained starting system 10 for a gas turbine engine is shown in FIG. 1, and generally comprises a rotatable starter motor 12 for rotatably driving a shaft 14 coupled to the compressor 16 of a gas turbine machine 18. Rotation of the compressor 16 develops compressed fluid discharged by the compressor which ultimately assists the gas turbine machine 18 in reaching continued self-sustained operation. Of course, when self-sustained operation is reached, the starter motor 12 may be suitably disconnected from the shaft 14 as by an overriding clutch (not shown) or the like for disconnecting the starting system 10 from the gas turbine machine 18.

The starter motor 12 is fluid-driven by a pressurized source of fluid provided from a portable supply tank or reservoir 20. The fluid in the supply reservoir 20 is typically at a relatively high pressure level, say on the order of about 4,000 p.s.i., and is initially supplied as by a conduit 22 to a pressure reduction regulator 24. The reduction regular 24 suitably reduces the pressure level of the fluid to a stable pressure on the order of about 400 p.s.i. for supply to the starter motor 12 as by a conduit 26. Conveniently, a meter 27 may be provided along the conduit 22 for monitoring the pressure level of fluid in the reservoir 20, and a return conduit 17 connects between the compressor 16 and the reservoir 20 to replenish the reservoir with bleed air after the machine 18 is started.

The pressure reduction regulator 24 is actuated for supply of fluid to the starter motor 12 as by a solenoid valve assembly 28. This valve assembly 28 is also coupled to the fluid supply reservoir 20 as by a high pressure conduit 30, and operates to control coupling of the high pressure fluid to an upper chamber (not shown in FIG. 1) of the pressure reduction regulator 24 as by conduits 32 and 34. More specifically, during operation of the starting system, the solenoid valve assembly 28 couples the high pressure supply fluid to the upper chamber, and when the starting system is disabled the solenoid valve assembly couples this upper chamber to atmosphere via a vent 36. Moreover, during operation of the system, the solenoid valve assembly 28 couples high pressure fluid to a static reference pressure regulator 38 as by a conduit 40, and this device serves to provide a static regulated reference pressure to the pressure reduction regulator 24 by a conduit 42 for closely controlling operation of the reduction regulator 24. Importantly, this reference pressure regulator 38 typically comprises a relatively conventional spring-diaphragm system, and thereby is not shown or described in detail herein.

While the components of the pressure regulator system of this invention, including the pressure reduction regulator 24, solenoid valve assemby 28, and static reference pressure regulator 38, are illustrated herein in conjunction with a pressure activated starting system for a gas turbine machine, it should be understood that the pressure regulator system is applicable to a variety of pressure systems. That is, the pressure regulator system of this invention is readily adapted for use whenever a relatively low regulated fluid pressure is required from a relatively high pressure fluid source. Exemplary systems wherein the pressure regulator system of this invention is applicable include pneumatic gun drives, and the like.

The pressure reduction regulator 24 is shown in more detail in FIGS. 2-5. As shown, the reduction regulator 24 comprises a multi-section valve body 44 which is suitably coupled together as by a series of bolts 46. This valve body 44 includes an inlet end 47 for coupling to the high pressure fluid supply conduit 22, and an outlet or exducer section 48 communicating with the low pressure outlet conduit 26 connected to the starter motor 12. Between the inlet end 47 and the exducer section 48, a multiple piece valve seat 50 is arranged for seating a bulbular or generally tulip-shaped poppet valve head 52. More specifically, an annular ring 54 formed from a suitable deformable plastic material having high quality resilient memory, such as a polyimide, comprises a primary valve seat having a generally wedge-shaped seat face 56. This primary seat ring 54 is wedged as will be described in more detail upon a valve seat base 58 formed from a suitable metal such as stainless steel or the like. Importantly, the valve seat base 58 includes an annular exducer shroud 60 which extends into and radially expands slightly into an exducer collection chamber 163 downstream of the valve seat base 58. With this configuration, the bulbular valve head 52 combines with the multiple piece valve seat 50 to define a converging-diverging nozzle flow path past the valve seat 50 when the valve head 52 is in an open position.

Figure 2:
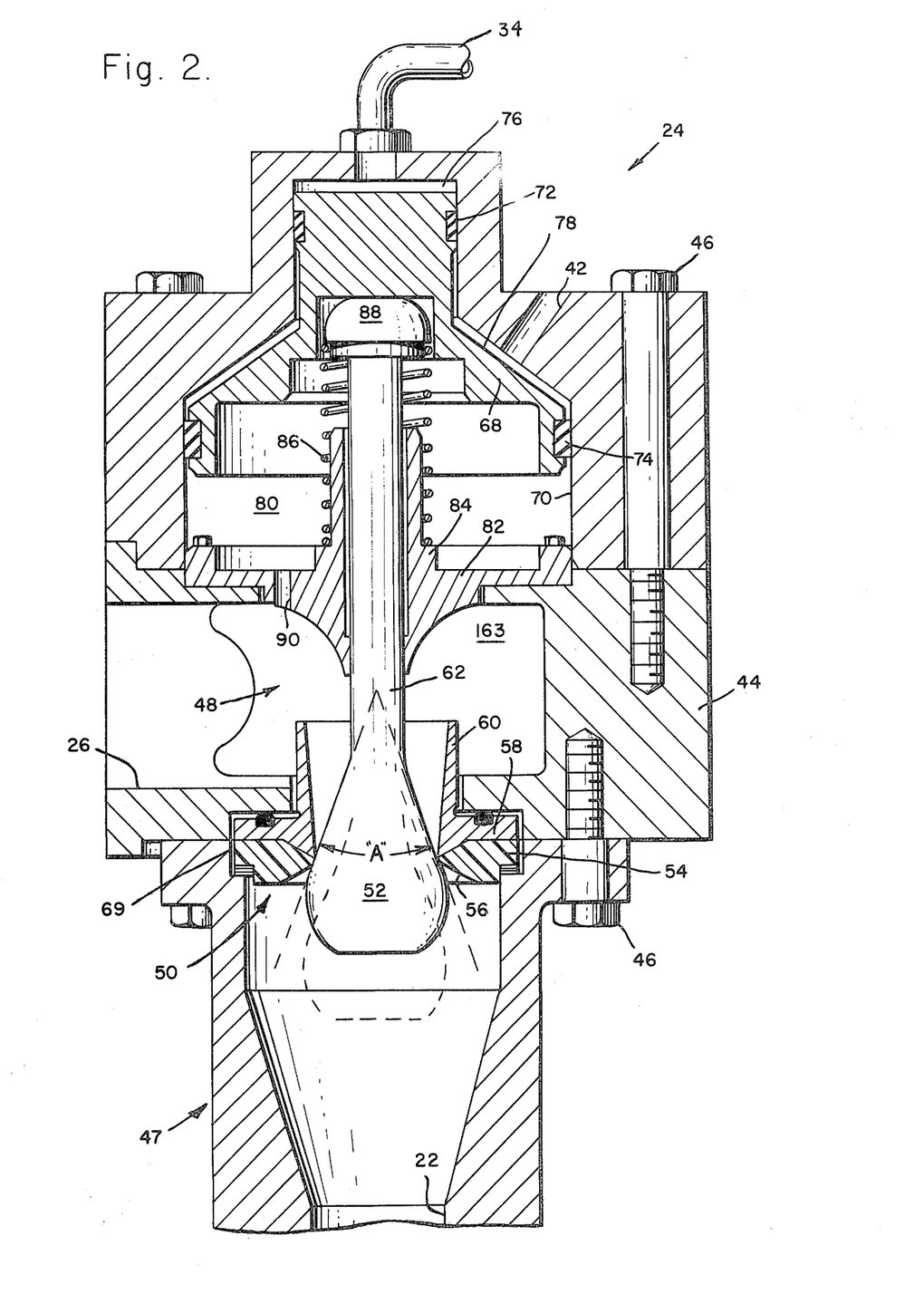
FIG. 2 is a vertical section of a pressure reduction regulator for use in the regulator system.

The poppet valve head 52 has a cross section which extends and expands from a valve stem 62 within the exducer section 48 through the valve seat 50 into the high pressure region within the inlet end 47. Accordingly, the poppet valve head 52 is arranged for seating upon the valve seat face 56 of the plastic ring 54 in a self-aligning and self-centering manner. Moreover, the high pressure fluid within the inlet end 47 of the reduction regulator 24 urges the valve head 52 toward a normal position seated upon the valve seat 50 to close the reduction regulator 24 to fluid flow.

Figures 3, 4, 5:
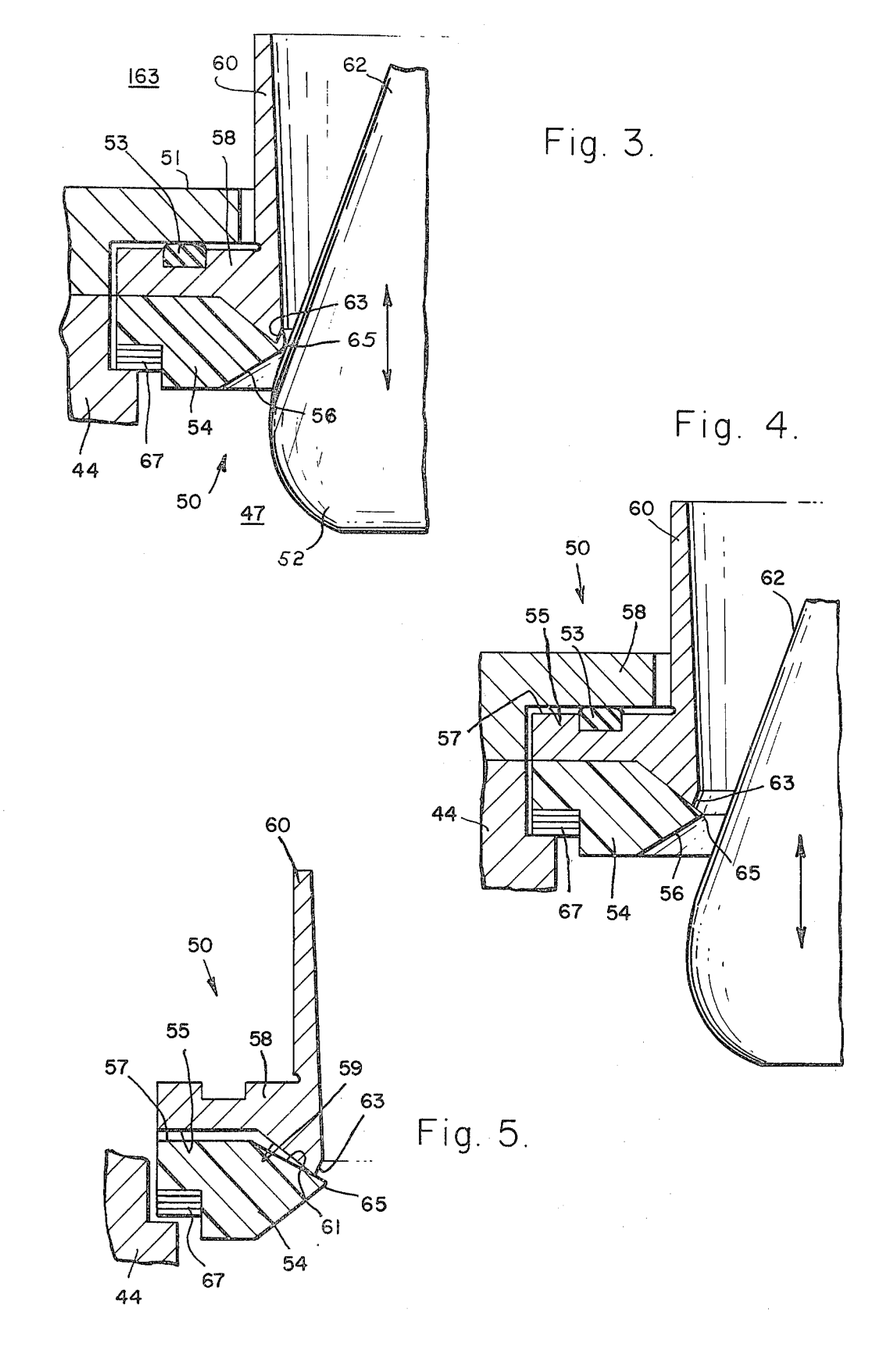
FIG. 3 is an enlarged fragmented view of the reduction regulator of FIG. 2, showing the regulator in a position closed to fluid flow.
FIG. 4 is an enlarged fragmented view similar to FIG. 3, showing the reduction regulator in a position open to fluid flow.
FIG. 5 is an enlarged fragmented view similar to FIGS. 3 and 4, partially exploded, illustrating the interfitting components of the reduction regulator valve seat.

The configuration of the multiple piece valve seat 50 is shown in detail in FIGS. 3-5. As shown, one section of the valve body 44 includes an inwardly radiating flange 51 forming a support surface for the valve seat base 58. If desired, a seal ring 53 is interposed between the flange 51 and the seat base 58 to prevent fluid leakage therebetween. The valve seat base 58 is configured to have a horizontal bearing surface 55 formed in parallel with a mating surface 57 on the plastic ring 54, and a tapered conical face 59 which is slightly out of angular alignment with a corresponding tapered conical face 61 on the plastic ring 54 (FIG. 5). For example, the conical face 59 on the seat base 58 is formed at an angle of about 31° from the horizontal, whereas the conical face 61 on the plastic ring 54 is formed at an angle of about 29° from the horizontal. Moreover, the conical face 59 of the seat base 58 terminates in an angular bearing surface 63 for matingly engaging the conical cross section of the valve head 52, whereas the conical face 61 of the plastic ring 54 cooperates with the wedge-shaped valve seat face 56 to form a point 65. This point 65 slightly overlies the seat base bearing surface 63 so that the valve head 52 contacts first the point 65 of the plastic ring 54 upon movement to a closed position.

The seat base 58 and the plastic ring 54 of the valve seat 50 are wedged into position as illustrated in FIG. 5 by means of shims 67 to bring their respective horizontal bearing surfaces 55 and 57 into bearing engagement. The shims 67 also force the plastic ring 67 to deform slightly to bring the conical faces 59 and 61 into bearing engagement. This slight deformation places the plastic ring 54 under pressure so that the valve head 52, when moved to the closed position as shown in FIG. 3, engages the point 65 of the plastic ring 54 to force the point 65 into a bottomed-out position overlying the angular bearing surface 63 of the seat base 58. When the valve head 52 returns to an open position, the point 65 returns to its original position, as illustrated in FIG. 4. With this arrangement, the multiple piece valve seat 50 cooperates with the valve head 52 to provide a high quality, leak-free seal when the valve head is in the closed position. Conveniently, the plastic ring 54 and the seat base 58 are formed with radial clearance with respect to the valve body 44, as indicated by arrow 69, so as to allow a slight radial floating for self-centering with the valve head 52.

The cross sectional profile of the poppet valve head 52 is carefully tailored to provide smooth transonic fluid flow from the high pressure inlet end 47 of the regulator 24 to the exducer section 48. That is, as shown in FIG. 2, the expanding cross section of the bulbular-shaped valve head 52 is formed generally to have an included angle "A" on the order of about 40°. This included angle "A" configuration extends through the valve seat 50 to define the digerging portion of the nozzle path having a flow angle between the valve head 52 and the shroud 60 of about 35°. This configuration has been found to provide smooth transonic fluid flow through the valve seat 50 by removing tranversely acting sonic shock waves and feedback effects from the vicinity of the valve seat 50 whenever the valve head 52 is moved to the open, dotted line position illustrated in FIG. 2. This provision of smooth, transonic fluid flow results in a stable and controlled pressure output supplied to the starter motor 12 via the conduit 26. Of course, the specific included angle is tailored to match the particular pressure differential encountered across the valve seat 50 for a given application of the reduction regulator, and may vary considerably from 40°. However, in many typical systems encountering an approximate 10:1 pressure reduction ratio and a pressure differential of say about 3,000-10,000 p.s.i., and a mass flow rate of about 100 pounds per minute, an included angle of about 40° has been found to produce the desired smooth, stable transonic flow. Moreover, it has been found that the optimum included angle generally decreases with increases in transonic mass flow.

The valve head 52 is moved to the open, dotted line position of FIG. 2 by means of a balancing system including a balancing piston 68 received within a cylinder 70 in the upper end of the valve body 44. As shown, the balancing piston 68 is elongated within the cylinder 70, and includes an upper seal ring 72 and a lower seal ring 74. The central portion of the balancing piston 68 expands radially and downwardly in conformance with the contour of the cylinder 70 so as to define an upper pressure chamber 76, an intermediate pressure chamber 78, and a lower pressure chamber 80. Controlled pressures, as will be hereafter described, are applied to these pressure chambers 76, 78, and 80 to move the balancing piston 68 downwardly into bearing engagement with the upper end of the valve stem 62, and thereby control the position of the valve head 52 with respect to the valve seat 50. Conveniently, the lower pressure chamber 80 is partially closed at its lower end by a plate 82 including a central boss 84 comprising a valve guide for the valve stem 62. A compression spring 86 reacts between the plate 82 and an enlargement 88 at the upper end of the valve stem 62 to bias the entire assembly to a position closing or seating the valve head 52 on the valve seat 50 to block fluid flow through the reduction regulator 24.

As illustrated in FIGS. 1 and 2, the solenoid valve assembly 28 operates to couple high pressure supply fluid from the fluid reservoir 20 to the pressure reduction regulator 24 via the conduits 32 and 34. The conduit 34, when supplied with high pressure fluid, couples the high pressure fluid to the upper pressure chamber 76 in communication with the balancing piston 68. Importantly, the surface area of the balancing piston 68 exposed to this upper chamber 76 generally corresponds with the surface area of the poppet valve head 52 exposed to high pressure fluid within the inlet end 47, whereby the opposite ends of the poppet valve head 52 within the reduction regulator 24 are substantially pressure-balanced. However, the solenoid valve assembly 28 also functions to supply the high pressure fluid to the static reference pressure regulator 38 which in turn supplies the static reference pressure to the reduction regulator 24 via the conduit 42. This conduit communicates the reference pressure to the intermediate pressure chamber 78 so as to create a force imbalance upon the balancing piston 68. This force imbalance urges the balancing piston 68 to move downwardly within the cylinder 70 and thereby also to urge the poppet valve 52 to move off the valve seat 50. Opening of the valve head 52 allows the pressure level in the collection chamber 163 of the exducer section 48 to increase. The increasing pressure level in this collection chamber 163 is communicated with the lower pressure chamber 80 of the cylinder 70 via a port 90 formed in the plate 82 so as to allow the pressure level in the lower pressure chamber 80 also to increase. Importantly, the combined effect of the increasing pressure in the lower pressure chamber 80 together with spring forces applied by the spring 86 urges the balancing piston 68 back toward the upper full line position shown in FIG. 2 to attempt to close the poppet valve head 52. In this manner, the position of the poppet valve head 52 is modulated with respect to the valve seat 50 to balance the total forces upon the balancing piston 68 and thereby provide a predetermined and stable output pressure to the starter motor 12. In practice, the level of this output pressure generally corresponds in magnitude to the pressure level of the static reference pressure applied to the balancing piston 68 less spring forces applied to the piston 68.

From the foregoing description of the pressure regulation system, with its specially designed reduction regulator apparatus, it should be clear that the present invention also affords unique methods of providing a relatively low pressure fluid flow from a relatively high pressure fluid source or, stated differently, of controlling fluid flow between a fluid inlet and a fluid outlet.

In general, such methods would comprise the steps of forming the system elements, by any desired and appropriate forming technique, to have their illustrated configurations and other features; relatively orienting the elements as described; and exposing certain of such elements to the various balancing and positioning pressures in the manner set forth above.

As but one example of such methods, a relatively low pressure fluid flow would be provided from a relatively high pressure fluid source by the steps of positioning a pressure reduction valve between a high pressure inlet coupled to the fluid source and a low pressure outlet; forming a balancing piston to have a first end with surface area generally corresponding with the surface area of the reduction valve exposed to high fluid pressure, an opposite second end of relatively enlarged surface area, and a radially expanding intermediate portion; mounting the piston in a complementary-formed cylinder with the second end in movable engagement with the reduction valve and in fluid communication with the low pressure outlet; applying pressure from the fluid source to the piston first end for pressure-balancing opposite ends of the reduction valve; and applying a controlled reference fluid pressure to the piston intermediate portion for urging the reduction valve to a position open to fluid flow, the fluid in the outlet serving to pressure-balance the piston intermediate portion and second end whereby the fluid pressure in the outlet comprises a predetermined function of the reference pressure.

Figure 6:
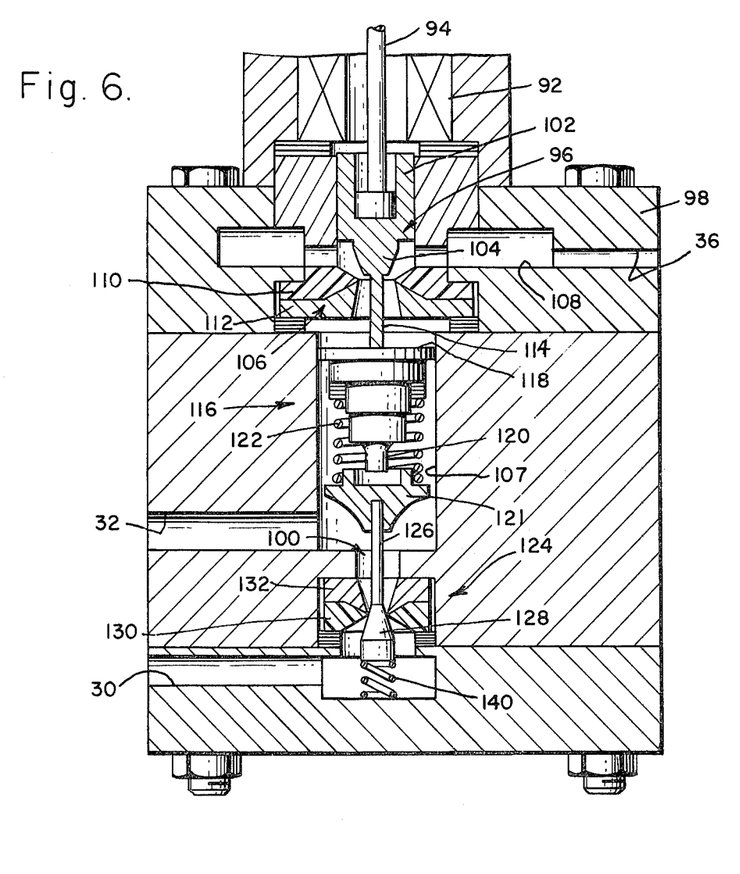
FIG. 6 is a vertical section, partially fragmented, of an improved solenoid valve assembly for use in the system.

The solenoid valve assembly 28 of this invention is shown in more detail in FIG. 6. As shown, the valve assembly 28 includes a solenoid winding 92 and a movable armature 94 which is magnetically shifted by means of control of electrical current in the winding 92, in a well known manner. The armature 94 operates a vent valve 96 carried in an upper portion of a valve body 98 for closing the vent conduit 36, and at the same time operates a high pressure valve 100 for opening communication between the high pressure inlet conduit 30 and the outlet conduit 32.

More specifically, the vent valve 96 includes a hollow base 102 into which the armature 94 is received in bearing engagement with the valve 96. When the armature is shifted downwardly as viewed in FIG. 6, a valve member 104 of generally conical cross section formed integrally with the hollow base 102 is moved into sealing engagement with an associated valve seat 106. Contact with the valve seat 106 closes off communication between a central cavity 107 in the valve body 98 and a collection chamber 108 communicating with the vent conduit 36. Since the central cavity 107 communicates with the outlet conduit 36, closure of the vent valve member 104 removes a vent connection venting the upper chamber 76 of the reduction regulator 24 (FIG. 2). Conveniently, as shown in FIG. 6, the vent valve seat 106 comprises a multiple piece valve seat including a resilient plastic ring 110 based upon a metal seat base 112, similar to the valve seat 50 of FIG. 2.

The vent valve 96 also includes a push rod 114 which extends downwardly into the central cavity 107 to bearingly engage a lost motion unit 116. That is, the push rod 114 engages a plate 118 from which a valve actuator 120 depends downwardly. The valve actuator 120 comprises a push rod type member which is maintained in vertically spaced relation above an impact plate 121 by a compression spring 122. Importantly, the spacing between the valve actuator 120 and the impact plate 121 is carefully chosen to be slightly less than the stroke length of the solenoid armature 94. That is, in a preferred embodiment by way of example, the spacing between the valve actuator 120 and the impact plate 121 is chosen to be about 0.040 inch with a solenoid armature stroke travel of about 0.045 inch. With this arrangement, during the initial and major portion of the solenoid armature stroke, lost motion occurs between the valve actuator 120 and the impact plate 121 resulting in compression of the spring 122 to store kinetic and potential energy in the spring.

When the valve actuator 120 strikes the impact plate 121, the high pressure valve 100 is moved off its associated valve seat 124 to open high pressure fluid flow to the outlet conduit 32. That is, the high pressure valve 100 includes a valve stem 126 secured to the impact plate 121 and formed integrally with a high pressure valve head 128 of generally conical cross section. Impact of the valve actuator 120 with the impact plate 121 thus shifts the valve head 128 off its seat 124 to open the valve 100 to fluid flow. Conveniently, this valve seat 124 also comprises a multiple piece valve seat having a deformable plastic ring 130 supported upon a rigid metal seat base 132, in the same manner as the valve seat 50 of FIG. 2.

The solenoid valve assembly 28 of this invention maximizes the capacity of the solenoid core 92 and armature 94 to open the high pressure valve 100. That is, during the initial, relatively low-force portion of the initial armature travel, kinetic and potential energy is stored in the spring 122 of the lost motion unit 116. During the latter, maximum power portion of the armature travel, the valve actuator 120 impacts the impact plate 121 to directly shift the high pressure valve head 128 from its seat 124. Importantly, the impact forces comprise a summation of direct solenoid energy together with energy stored by the spring 122. Once the valve head 128 initially lifts from its seat 124, the high pressure differential across the seat is removed and further opening movement is readily accomplished by means of remaining stored energy in the spring 122. Thus, in operation, downward movement of the armature 94 substantially simultaneously closes the vent valve 96 and begins movement of the high pressure valve 100. The armature 94 moves the vent valve 96 to close off the vent connection to the outlet conduit 32, and at the same time opens the high pressure valve 100 to couple high pressure fluid to the outlet conduit 32. In this manner, high pressure fluid is supplied to the pressure reduction regulator 24 (FIG. 1) and to the static reference pressure regulator 38 to initiate operation of the pressure regulator system 10. Of course, when the solenoid valve assembly is de-energized, the armature 94 retracts to allow high pressure in the conduit 30 to close the high pressure valve 100 and open the vent valve 96. If desired, a compression spring 140 may be provided in engagement with the high pressure valve head 128 to assist return thereof to a closed position.

A wide variety of modifications and improvements of the pressure regulator system of this invention are believed to be possible within the scope of the art. For example, if necessary, the static reference pressure regulator 38 may be designed to include a valve poppet and multiple piece valve seat construction generally consistent with that of the pressure reduction regulator 24 described in detail herein. Accordingly, no limitation of the invention is intended by way of the description herein except as set forth in the appended claims.

What is claimed is:

1. A pressure regulator system comprising a relatively high pressure fluid source; a pressure reduction regulator having a pressure reduction valve for controlling fluid flow between a high pressure inlet coupled to said fluid source and a low pressure outlet; pressure balancing means for controlling the position of said reduction valve for controlling the fluid pressure in said outlet, said balancing means including a balancing piston movably engaging said reduction valve and received in a complementary-formed cylinder, said piston having first end opposite said reduction valve with a surface area generally corresponding with the effective surface area of said reduction valve exposed to high fluid pressure, a second end with relatively enlarged surface area communicating with said low pressure outlet, and a radially expanding, axially sloping intermediate portion extending within said cylinder and interconnecting said first and second ends of said piston; means for applying pressure from said fluid source to said first end for pressure-balancing opposite ends of said reduction valve; and means for applying a controlled reference fluid pressure to said intermediate portion for urging said reduction valve only toward a position open to fluid flow, the fluid in said outlet serving to pressure-balance said intermediate portion and said second end of said piston whereby the fluid pressure in said outlet is related to said reference pressure in a predetermined manner.

2. The invention as set forth in claim 1 wherein said means for applying pressure from said fluid source to said first end of said piston comprises a conduit coupled between said fluid source and said cylinder, and a control valve for opening and closing said conduit to fluid flow.

3. The invention as set forth in claim 2 wherein said means for applying said reference pressure to said intermediate portion comprises a static reference pressure reduction regulator coupled between said control valve and said cylinder.

4. The invention as set forth in claim 1 wherein said means for applying said reference pressure to said intermediate portion comprises a static reference pressure reduction regulator coupled between said fluid source and said cylinder.

5. The invention as set forth in claim 1 wherein said reduction valve comprises a valve seat, a valve head for seating upon the high pressure side of said valve seat, and a valve stem extending from said valve head through said outlet into engagement with said balancing piston.

6. The invention as set forth in claim 5 including means for biasing said valve head to a position seated upon said seat for closing said reduction valve to fluid flow.

7. The invention as set forth in claim 6 wherein said biasing means comprises a spring.

8. The invention as set forth in claim 5 wherein said valve head has a generally conical cross section expanding through the valve seat from said low pressure outlet into said high pressure inlet, the cross sectional included angle of said valve head being predetermined according to maximum fluid mass flow and pressure differential across said valve seat.

9. The invention as set forth in claim 8 wherein said valve seat comprises a rigid valve seat base and a resilient elastomeric ring overlying said base, said ring bearingly receiving said valve head when said head is seated upon said valve seat.

10. The invention as set forth in claim 9 wherein said ring is formed to include a wedge-shaped seat face for bearingly receiving said valve head.

11. The invention as set forth in claim 2 wherein said control valve comprises a solenoid having an energizable winding for moving armature means through a predetermined stroke distance, an impact member, a compression spring reacting between said armature means and said impact member for normally maintaining said armature means spaced from said impact member a distance at least slightly less than the armature means stroke distance, and a high pressure valve member movable by said impact member to open said conduit to high pressure fluid flow, said spring being for storing stroke energy through an initial portion of armature means stroke, and for summing the stored energy with stroke energy throughout a latter portion of armature means stroke upon impact of said armature means with said impact member to move said valve member to open said conduit.

12. The invention as set forth in claim 11 including means for normally biasing said high pressure valve member to a position closing said conduit to high pressure fluid flow.

13. The invention as set forth in claim 11 wherein said high pressure valve member comprises a valve seat having a fluid inlet side and a fluid outlet side, a valve head for seating upon the fluid inlet side of said high pressure valve seat, and a valve stem extending between said high pressure valve head and said impact member.

14. The invention as set forth in claim 13 wherein said high pressure valve head has a generally conical cross section expanding through the valve seat from said fluid outlet side to said fluid inlet side, and wherein said valve seat is mounted for limited radial floating whereby said valve seat and valve head self-align with each other.

15. The invention as set forth in claim 14 wherein said valve head is formed to have a cross sectional included angle of on the order of about 40°.

16. The invention as set forth in claim 14 wherein said valve seat comprises a rigid valve seat base and a resilient elastomeric ring overlying said base, said ring bearingly receiving said valve head when said head is seated upon said valve seat.

17. The invention as set forth in claim 11 wherein said armature means comprises an armature translatable upon energization of said winding, and a valve actuator movable by said armature for impacting said impact member, said compression spring reacting between said valve actuator and said impact member.

18. The invention as set forth in claim 17 including a vent valve biased to a normal position for venting said first end of said piston, said vent valve being movable by said armature upon energization of said winding to close the vent of said first end substantially simultaneously with movement of said high pressure valve member to a position to open said conduit to high pressure fluid flow.

19. The invention as set forth in claim 18 wherein said vent valve comprises a vent valve head having a generally conical cross section movable by said armature and a vent valve seat mounted for limited radial floating for receiving said valve head in self-centering alignment.

20. The invention as set forth in claim 19 wherein said valve seat comprises a rigid valve seat base and a resilient elastomeric ring overlying said base, said ring bearingly receiving said valve head when said head is seated upon said valve seat.

21. A pressure regulator system comprising a relatively high pressure fluid source; a pressure reduction regulator having a pressure reduction valve for controlling fluid flow between a high pressure inlet coupled to said fluid source and a low pressure outlet, said reduction valve including a valve seat with a rigid valve seat base and a resilient elastomeric ring overlying said base, a valve head of generally conical cross section for seating upon said ring on the high pressure side of said valve seat, said valve head cross section expanding through the valve seat from said low pressure outlet into the high pressure inlet with a cross sectional included angle predetermined according to maximum fluid mass flow and pressure differential across said valve seat, and a valve stem extending from said valve head through said outlet; pressure balancing means for controlling the position of said reduction valve for controlling the fluid pressure in said outlet, said balancing means including a balancing piston movably engaging said reduction valve stem and received in a complementary-formed cylinder, said piston having a first end opposite said reduction valve with a surface area generally corresponding with the surface area of said reduction valve exposed to high fluid pressure, a second end with a relatively enlarged surface area communicating with said low pressure outlet, and a radially expanding, axially sloping intermediate portion extending within said cylinder and interconnecting said first and second ends of said piston; means for applying pressure from said fluid source to said first end for pressure-balancing opposite ends of said reduction valve; and means for applying a controlled reference fluid pressure to said intermediate portion for urging said reduction valve only toward a position open to fluid flow, the fluid in said outlet serving to pressure-balance said intermediate portion and said second end of said piston whereby the fluid pressure in said outlet is related to said reference pressure in a predetermined manner.

22. A pressure regulator system comprising a relatively high pressure fluid source; a pressure reduction regulator having a pressure reduction valve for controlling fluid flow between a high pressure inlet coupled to said fluid source and a low pressure outlet, said reduction valve including a valve seat with a rigid valve seat base and a resilient elastomeric ring overlying said base, said seat base and ring being formed to have mutually parallel bearing surfaces and to have tapered conical faces extending from the bearing surfaces slightly out of angular alignment with each other, said tapered conical face of said base terminating in an angularly oriented bearing surface and said tapered coniacal face of said ring terminating in a radially inwardly projecting point overlying said angularly oriented bearing surface, means for deforming said ring to bring the parallel bearing surfaces and the conical faces of said base and ring into bearing engagement with each other, a valve head of generally conical cross section configured for mating engagement with said angularly oriented bearing surface and for seating upon said point on the high pressure side of said valve seat whereby said point bottoms out upon said angularly oriented bearing surface when said head is seated upon said valve seat, said valve head cross section expanding through the valve seat from said low pressure outlet into the high pressure inlet with a cross sectional included angle predetermined according to maximum fluid mass flow and pressure differential across said valve seat, and a valve stem extending from said valve head through said outlet; pressure balancing means for controlling the position of said reduction valve for controlling the fluid pressure in said outlet, said balancing means including a balancing piston movably engaging said reduction valve stem and received in a complementary-formed cylinder, said piston having a first end opposite said reduction valve with surface area generally corresponding with the surface area of said reduction valve exposed to high fluid pressure, a second end with relatively enlarged surface area communicating with said low pressure outlet, and a radially expanding intermediate portion; means for applying pressure from said fluid source to said first end for pressure-balancing opposite ends of said reduction valve; and means for applying a controlled reference fluid pressure to said intermediate portion for urging said reduction valve only toward a position open to fluid flow, the fluid in said outlet serving to pressure-balance said intermediate portion and said second end of said piston, whereby the fluid pressure in said outlet is related to said reference pressure in a predetermined manner.

23. A pressure regulator system comprising a relatively high pressure fluid source; a pressure reduction regulator having a pressure reduction valve for controlling fluid flow between a high pressure inlet coupled to said fluid source and a low pressure outlet, said reduction valve including a valve seat with a rigid valve seat base and a resilient elastomeric ring overlying said base, and a valve head of generically conical cross section for seating upon said ring on the high pressure side of said valve seat, said valve head cross section expanding through the valve seat from said low pressure outlet into the high pressure inlet with a cross sectional included angle predetermined according to maximum fluid mass flow and pressure differential across said valve seat and a valve stem extending from said valve head through said outlet; pressure balancing means for controlling the position of said reduction valve for controlling the fluid pressure in said outlet, said balancing means including a balancing piston movably engaging said reduction valve stem and received in a complementary-formed cylinder, said piston having a first end opposite said reduction valve with surface area generally corresponding with the surface area of said reduction valve exposed to high fluid pressure, a second end with relatively enlarged surface area communicating with said low pressure outlet, and a radially expanding intermediate portion; a control valve operable for applying pressure from said fluid source to said first end for pressure-balancing opposite ends of said reduction valve, said control valve comprising a solenoid having an energizable winding for moving armature means through a predetermined stroke distance, an impact member, a compression spring reacting between said armature means and said impact member for normally maintaining said armature means spaced from said impact member a distance at least slightly less than the armature means stroke distance, and a high pressure valve member movably by said impact member to open said first end to high pressure fluid, said spring being for storing stroke energy through an initial portion of armature means stroke, and for summing the stored energy with stroke energy throughout a latter portion of armature means stroke upon impact of said armature means with said impact member to move said valve member to open said conduit; and means for applying a controlled reference fluid pressure to said intermediate portion for urging said reduction valve only toward a position open to fluid flow, the fluid in said outlet serving to pressure-balance said intermediate portion and said second end of piston whereby the fluid pressure in said outlet is related to said reference pressure in a predetermined manner.

24. The invention as set forth in claim 23 wherein said high pressure valve member comprises a valve seat having a fluid inlet side and a fluid outlet side, a valve head for seating upon the fluid inlet side of said high pressure valve seat, and a valve stem extending between said high pressure valve head and said impact member.

25. The invention as set forth in claim 24 wherein said high pressure valve head has a generally conical cross section expanding through the valve seat from said fluid outlet side to said fluid inlet side, and wherein said valve seat is mounted for limited radial floating whereby said valve seat and valve head self-align with each other.

26. The invention as set forth in claim 25 wherein said seat base and ring of said reduction valve seat are formed to have mutually parallel bearing surfaces and to have tapered conical faces extending from the bearing surfaces slighlty out of angular alignment with each other, said tapered conical face of said base terminating in an angularly oriented bearing surface and said tapered conical face of said ring terminating in a radially inwardly projecting point overlying said angularly oriented bearing surface, and means for deforming said ring to bring the parallel bearing surfaces and the conical faces of said base and ring into bearing engagement with each other, whereby said point bottoms out upon said angularly oriented bearing surface when said reduction valve head is seated thereon.

27. The invention as set forth in claim 26 wherein said seat base and ring of said high pressure valve member are formed to have a geometry substantially identical with the geometry of said seat base and ring of said reduction valve.

28. The invention as set forth in claim 27 including a vent valve biased to a normal position for venting said first end of said piston, said vent valve being movable by said armature means upon energization of said winding to close the vent of said first end substantially simultaneously with movement of said high pressure valvemember to a position to open said first end to high pressure fluid, said vent valve comprising a vent valve head having a generally conical cross section movable by said armature means, and a vent valve seat mounted for limited radial floating for receiving said valve head in self-centering alignment, said vent valve seat including a vent valve seat base and ring formed to have a geometry substantially identical with the geometry of said reduction valve seat base and ring.

29. A pressure reduction regulator for controlling fluid flow between a high pressure fluid inlet coupled to a high pressure fluid source and a low pressure fluid outlet comprising a valve seat; a valve head for seating upon the high pressure side of said valve seat; a valve stem extending from said valve head through said outlet; pressure balancing means for controlling the position of said valve head for controlling the fluid pressure in said outlet, said balancing means including a balancing piston movably engaging said valve stem and received in a complementary-formed cylinder, said piston having a first end positioned opposite said valve stem and having a surface area generally corresponding with the effective surface area of said valve head exposed to high fluid pressure, a second end with relatively enlarged surface area communicating with said outlet, and a radially expanding, axially sloping intermediate portion extending within said cylinder and interconnecting said first and second ends of said piston, said balancing piston being responsive to application of pressure from the fluid source to said first end to pressure-balance opposite ends of said valve head, and responsive to application of a controlled reference pressure to said intermediate portion for urging said valve head only toward an open position with respect to said valve seat whereupon the fluid pressure in said outlet communicating with said second end of said piston pressure-balances said intermediate portion and second end whereby the fluid pressure in said outlet is related to the controlled reference pressure in a predetermined manner.

30. The invention as set forth in claim 29 wherein said valve head has a generally conical cross section expanding through the valve seat from said low pressure outlet into said high pressure inlet, the cross sectional included angle of said valve head being predetermined according to maximum fluid mass flow and pressure differential across said valve seat.

31. The invention as set forth in claim 30 wherein said valve seat comprises a rigid valve seat base and a resilient elastomeric ring overlying said base, said ring bearingly receiving said valve head when said head is seated upon said valve seat.

32. A pressure reduction regulator for controlling fluid flow between a high pressure fluid inlet coupled to a high pressure fluid source and a low pressure fluid outlet, comprising a valve seat with a rigid valve seat base and a resilient elastomeric ring overlying said base; a valve head of generally conical cross section expanding through the valve seat from said low pressure outlet into said high pressure inlet with a cross sectional included angle predetermined according to maximum fluid mass flow and pressure differential across said valve seat; a valve stem extending from said valve head through said outlet; pressure balancing means for controlling the position of said valve head for controlling the fluid pressure in said outlet, said balancing means including a balancing piston movably engaging said valve stem and received in a complementary-formed cylinder, said piston having a first end opposite said valve stem generally corresponding with the surface area of said valve head exposed to high fluid pressure, a second end with relatively enlarged surface area communicating with said outlet, and a radially expanding intermediate portion, said balancing piston being responsive to application of pressure from the fluid source to said first end to pressure-balance opposite ends of said valve head, and responsive to application of a controlled reference pressure to said intermediate portion for urging said valve head only toward an open position with respect to said valve seat whereupon the fluid pressure in said outlet communicating with said second end of said piston pressure-balances said intermediate portion and second end whereby the fluid pressure in said outlet is related to the controlled reference pressure in a predetermined manner.

33. A pressure reduction regulator for controlling fluid flow between a high pressure fluid inlet coupled to a high pressure fluid source and a low pressure fluid outlet, comprising a valve seat with a rigid valve seat base and a resilient elastomeric ring overlying said base; said seat base and ring being formed to have mutually parallel bearing surfaces and to have tapered conical faces extending from the bearing surfaces slightly out of angular alignment with each other, said tapered conical face of said base terminating in angularly oriented bearing surface and said tapered conical face of said ring terminating in a radially inwardly projecting point overlying said angularly oriented bearing surface; means for deforming said ring to bring the parallel bearing surfaces and the conical faces of said base and ring into bearing engagement with each other; a valve head of generally conical cross section for seating upon said ring on the high pressure side of said valve seat, said valve head cross section expanding through the valve seat from said low pressure outlet into said high pressure inlet with a cross sectional included angle predetermined according to maximum fluid mass flow and pressure differential across said valve seat; a valve stem extending from said valve head through said outlet; pressure balancing means for controlling the position of said valve head for controlling the fluid pressure in said outlet, said balancing means including a balancing piston movably engaging said valve stem and received in a complementary-formed cylinder, said piston having a first end opposite said valve stem generally corresponding with the surface area of said valve head exposed to high fluid pressure, a second end with relatively enlarged surface area communicating with said outlet, and a radially expanding intermediate portion, said balancing piston being responsive to application of pressure from the fluid source to said first end to pressure-balance opposite ends of said valve head, and responsive to application of a controlled reference pressure to said intermediate portion for urging said valve head only toward an open position with respect to said valve seat whereupon the fluid pressure in said outlet communicating with said second end of said piston pressure-balances said intermediate portion and second end whereby the fluid pressure in said outlet is related to the controlled reference pressure in a predetermined manner.

34. The invention as set forth in claim 5 or 21 wherein said means for applying pressure from said fluid source to said first end of said piston includes a control valve for controllably preventing application of pressure from said fluid source to said piston first end, whereby the high pressure fluid in said high pressure inlet urges said valve head to a normal position seated upon said valve seat to close said reduction valve to fluid flow.

35. The invention as set forth in claim 8 or 30 wherein said valve head is formed to have a cross sectional included angle comprising a decreasing function of transonic fluid mass flow across said valve seat.

36. The invention as set forth in claim 9 or 21 or 31 wherein said seat base is formed integrally with a diverging exducer shroud extending at least partially into said low pressure outlet.

37. The invention as set forth in claim 9 or 16 or 20 or 21 or 31 or 32 wherein said seat base and said ring are formed to have mutually parallel bearing surfaces, and to have tapered conical faces extending from the bearing surfaces toward said valve head and slightly out of angular alignment with each other, and including means for deforming said ring to bring the parallel bearing surfaces and the conical faces of said base and ring into bearing engagement with each other.

38. The invention as set forth in claim 37 wherein the tapered conical face of said seat base terminates adjacent said valve head in an angularly oriented bearing surface formed for matingly engaging the conical cross section of said valve head, and the tapered conical face of said ring terminates adjacent said valve head in a radially inwardly projecting point overlying said angularly oriented bearing surface whereby said point bottoms out upon said angularly oriented bearing surface when said valve head is seated upon said valve seat.

39. The invention as set forth in claim 5 or 21 or 22 or 30 wherein said valve seat is mounted for limited radial floating whereby said valve seat and valve head self-align with each other.

40. The invention as set forth in claim 9 or 31 wherein said ring is formed from a polyimide.

41. The invention as set forth in claim 8 or 30 wherein said valve head is formed to have a cross sectional included angle of on the order of about 40°.

42. A method of providing a relatively low pressure fluid flow from a relatively high pressure fluid source, comprising the steps of positioning a pressure reduction valve between a high pressure inlet coupled to the fluid source and a low pressure outlet; providing a balancing piston having a first end with surface area generally corresponding with the effective surface area of the reduction valve exposed to high fluid pressure, an opposite second end of relatively enlarged surface area, and a radially expanding intermediate portion; mounting the piston in a complementary-formed cylinder with the second end in movable engagement with said reduction valve and in fluid communication with the low pressure outlet; applying pressure from the fluid source to the piston first end for pressure-balancing opposite ends of said reduction valve; and applying a controlled reference fluid pressure to the piston intermediate portion for urging the reduction valve only toward a position open to fluid flow, the fluid in the outlet serving to pressure-balance the piston intermediate portion and second end whereby the fluid pressure in said outlet is related to the reference pressure in a predetermined manner.

43. The method of claim 42 wherein said step of applying pressure to the piston first end comprises coupling a conduit between the fluid source and the cylinder, and controllably opening and closing the conduit to fluid flow with a control valve.

44. The method of claim 42 wherein said step of applying pressure to the piston intermediate portion comprises coupling a static reference pressure regulator between the fluid source and the cylinder.

45. The method of claim 42 wherein said step of positioning said reduction valve comprises providing said valve with a valve seat, a valve head of generally conical cross section, and a valve stem extending from said head for engagement with said piston, and including positioning said valve head with its cross section expanding from the outlet through the valve seat to the inlet for seating upon the high pressure side of the valve seat.

46. The method of claim 45 including biasing the valve head to a normal position seated upon the valve seat to close the reduction valve to fluid flow.

47. The method of claim 45 including providing the valve head with a cross sectional included angle of on the order of about 40°.

48. The method of claim 45 including providing the valve seat with a rigid valve seat base and a resilient elastomeric ring overlying said base for bearingly receiving the valve head in a seated position.

49. The method of claim 48 wherein said last-mentioned providing step includes providing a polyimide valve seat ring.

50. The method of claim 48 including providing the valve seat base with a diverging exducer shroud extending at least partially into the low pressure outlet.

51. The method of claim 43 inclding the steps of providing the control valve with a solenoid having an energizable winding for moving armature means through a predetermined stroke distance, storing armature stroke energy with a spring through an initial stage of armature means stroke, and summing the stored energy with stroke energy throughout a latter stage of armature means stroke to impact the valve member to move the valve member to a position opening the conduit to fluid flow.

52. The method of claim 51 including biasing the valve member to a normal position closing the conduit to fluid flow.

53. The method of claim 51 including providing the valve member with a valve seat, a valve head of generally conical cross section, and a valve stem extending from the head for engagement with said armature means, and including positioning the valve head with its cross section expanding through the valve seat for seating upon the high pressure side of the valve seat.

54. The method of claim 51 including providing the control valve with a vent valve for venting the piston first end, and including operating the vent valve with the armature means to remove the vent of the piston first end substantially simultaneously upon movement of the valve member to open the conduit to fluid flow.

55. The method of claim 54 including providing the vent valve with a valve head of generally conical cross section movable by said armature means, and a valve seat mounted for limited radial floating for seating the valve head in self-centering alignment.

56. The method of claim 41 or 53 including providing the seat base and ring with mutually parallel bearing surfaces, and with tapered conical extending from the bearing surfaces toward the valve head slightly out of angular alignment with each other, and including the steps of deforming the ring to bring the conical faces and the bearing surfaces of the base and ring into mating engagement with each other.

57. The method of claim 56 including providing the termination of the tapered conical face of the seat base with an angularly oriented bearing surface corresponding with the valve head cross section, and providing the termination of the tapered conical face of the ring with a radially inwardly projecting point overlying the angularly oriented bearing surface, whereby the point bottoms out upon the angularly oriented bearing surface with the valve head seats upon the valve seat.

58. A method of providing a relatively low pressure fluid flow from a relatively high pressure fluid source, comprising the steps of providing a reduction valve having a valve head and a valve stem, and a valve seat having a rigid seat base and an overlying resilient ring with mutually parallel bearing surfaces and tapered conical faces extending radially inwardly slightly out of angular alignment with each other; deforming the ring to bring the conical faces and parallel bearing surfaces into mating engagement with each other; positioning the valve seat between a high pressure inlet coupled to the fluid source and a low pressure outlet; arranging the valve head for seating upon the ring on the high pressure side of the valve seat; providing a balancing piston having a first end with surface area generally corresponding with the surface area of the reduction valve exposed to high fluid pressure, an opposite second end of relatively enlarged surface area, and a radially expanding intermediate portion; mounting the piston in a complementary-formed cylinder with the second end in movable engagement with said reduction valve and in fluid communication with the low pressure outlet; applying pressure from the fluid source to the piston first end for pressure-balancing opposite ends of said reduction valve; and applying a controlled reference fluid pressure to the piston intermediate portion for urging the reduction valve only toward a position open to fluid flow, the fluid in the outlet serving to pressure-balance the piston intermediate portion and second end whereby the fluid pressure in said outlet is related to the reference pressure in a predetermined manner.

59. The method of claim 58 including providing the termination of the tapered conical face of the seat base with an angularly oriented bearing surface corresponding with the valve head cross section, and providing the termination of the tapered conical face of the ring with a radially inwardly projecting point overlying the angularly oriented bearing surface, whereby the point bottoms out upon the angularly oriented bearing surface when the valve head seats upon the valve seat.

60. The method of claim 58 wherein said step of applying pressure to the piston first end comprises coupling a conduit between the fluid source and the cylinder, and controllably opening and closing the conduit to fluid flow with a control valve, and including the steps of providing the control valve with a solenoid having an energizable winding for moving armature means through a predetermined stroke distance, storing armature stroke energy with a spring through an initial stage of armature means stroke, and summing the stored energy with stroke energy throughout a latter stage of armature means stroke to impact a valve member to move the valve member to a position opening the conduit to fluid flow.

61. The method of claim 60 including providing the control valve with a vent valve for venting the piston first end, and including operating the vent valve with the armature means to remove the vent of the piston first end substantially simultaneously upon movement of the valve member to open the conduit to fluid flow.

62. The method of claim 61 including providing said control valve and said vent valve each with a valve head and a valve seat base having configurations substantially identical to those of said reduction valve seat base and ring.

* * * * *

UNITED STATES PATENT AND TRADEMARK OFFICE
CERTIFICATE OF CORRECTION

PATENT NO. : 4,445,532
DATED : May 1, 1984
INVENTOR(S) : John D. Mitchell

It is certified that error appears in the above-identified patent and that said Letters Patent are hereby corrected as shown below:

Column 18, line 8, delete "41" and insert --48-- in place thereof.

Signed and Sealed this

Sixteenth Day of October 1984

[SEAL]

Attest:

Attesting Officer

GERALD J. MOSSINGHOFF

Commissioner of Patents and Trademarks